(12) United States Patent
Jones et al.

(10) Patent No.: US 7,536,101 B1
(45) Date of Patent: May 19, 2009

(54) COMMUNICATION SYSTEM WITH COST BASED PROTECTION

(75) Inventors: Mark Loyd Jones, Overland Park, KS (US); Charles William Norman, Lenexa, KS (US)

(73) Assignee: Sprint Communications Company LP, Overland Park, KS (US)

( * ) Notice: Subject to any disclaimer, the term of this patent is extended or adjusted under 35 U.S.C. 154(b) by 530 days.

(21) Appl. No.: 10/909,885

(22) Filed: Aug. 2, 2004

(51) Int. Cl.
*H04B 10/00* (2006.01)
(52) U.S. Cl. .............................. 398/5; 398/4
(58) Field of Classification Search ............... 398/1, 398/2, 3, 4, 5, 6, 7, 8; 370/228
See application file for complete search history.

(56) References Cited

U.S. PATENT DOCUMENTS

| | | | | |
|---|---|---|---|---|
| 5,838,924 A * | 11/1998 | Anderson et al. | ........... | 709/239 |
| 6,775,267 B1 * | 8/2004 | Kung et al. | ............... | 370/352 |
| 7,058,296 B2 * | 6/2006 | Saniee et al. | ................... | 398/3 |
| 7,155,534 B1 * | 12/2006 | Meseck et al. | .............. | 709/238 |
| 2002/0030864 A1 * | 3/2002 | Chaudhuri et al. | .......... | 359/110 |
| 2002/0131431 A1 * | 9/2002 | Wank et al. | ................. | 370/403 |
| 2004/0052520 A1 * | 3/2004 | Halgren et al. | ................. | 398/5 |

* cited by examiner

*Primary Examiner*—Christina Y Leung

(57) ABSTRACT

A communication system comprises a first communication device coupled to a first optical switch by a first link, a second communication device coupled to a second optical switch by a second link, and a third link and back-up links coupling the first and second optical switches. During normal operation, the optical switches connect the third link to the first and second links. The back-up links have various costs and latencies. In response to a fault on the third link, the first optical switch and the second optical switch automatically select an available one of the back-up links having a lowest cost and an acceptable latency, and in response to the selection, automatically disconnect the first link and the second link from the third link and automatically connect the first link and the second link to the selected back-up link.

16 Claims, 2 Drawing Sheets

FIG. 1 — PRIOR ART

COMMUNICATION SYSTEM WITH COST BASED PROTECTION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication systems that consider the cost of back-up links in a protection scheme.

2. Description of the Prior Art

FIG. 1 illustrates communication system 100 in an example of the prior art. Communication system 100 includes nodes 105-106 and paths 107-108. Node 105 includes routers 101-102 that form a first mated pair. Node 106 includes routers 103-104 that form a second mated pair. Path 107 includes links 111-112. Path 108 includes links 113-114. Link 111 couples router 101 to router 103. Link 112 couples router 102 to router 104. Link 113 couples router 101 to router 103. Link 114 couples router 102 to router 104.

Paths 107-108 are geographically diverse to provide path diversity if one of the paths fails. In this example, path 107 is geographically shorter than path 108—possibly by thousands of miles. In some cases, nodes 105 and 106 are on a communication ring where short path 107 represents a short segment of the ring between nodes 105-106, and long path 108 represents the longer segment around the other side of the ring.

In a normal operating mode, links 111-114 are each loaded to 40% of capacity. Thus, half of the traffic between nodes 105-106 traverses long path 108 in the normal operating mode. If router 101 fails, then mated router 102 takes over for router 101, so that router failure is handled at layer 2/3 of the Open Systems Interconnection (OSI) stack. In this failure mode, the load of links 111 and 113 drops to zero since these links are coupled to failed router 101, and correspondingly, the load of links 112 and 114 rises from 40% to 80%, because these links now carry the added load from unused links 111 and 113. Note that half of the traffic still takes the long path 108.

If link 111 fails, then router 101 transfers the traffic over link 113, so that link failure is also handled at OSI layer 2/3. In this failure mode, the load of failed link 111 drops to zero, and correspondingly, the load of link 113 rises from 40% to 80% since link 113 now carries the added load of failed link 111.

Router 101 has a carrier delay timer that starts after a loss of signal is detected, such as OSI layer 1 detection. The carrier delay timer must time out before the above-described OSI layer 2/3 restoration is implemented. The carrier delay timer prevents layer 2/3 restoration from occurring in response to a mere signal glitch where a quality signal quickly returns. The timer is set relatively low, such as 20 milliseconds.

The expense of links 111-114 can be measured by a fixed cost per mile, and thus, long links are more expensive than short links. Links 113-114 follow long path 108, which can be hundreds or thousands of miles longer than short path 107. Thus, links 113-114 are much more expensive to implement than shorter links 111-112.

In addition to the increased cost, the use of longer links 113-114 adds latency to communications between nodes 105-106. In the above example where router 101 shifts traffic from failed link 111 to link 113, the extra distance of longer link 113 adds latency to communications between nodes 105-106. In additional to the latency added by increased distance, long path 108 typically has more nodes (not shown) in between nodes 105-106 than does short path 107. The higher number of intermediate nodes adds additional latency to communications between nodes 105-106. Many customer applications cannot tolerate the latency of long path 108. The customer may have a Service Level Agreement (SLA) that specifies acceptable latencies.

Thus, current network designs carry large amounts of traffic over long paths—even under normal operating conditions—which forces the network to implement expensive high-capacity links over the longer path. This heavy use of the longer path also adds latency, which forces some customers to use a different communication network.

SUMMARY OF THE INVENTION

Examples of the invention include communication systems and their methods of operation. In some examples of the invention, a communication system comprises a first communication device and a second communication device, a first optical switch and a second optical switch. The communication system comprises a first link coupling the first communication device to the first optical switch, a second link coupling the second communication device to the second optical switch, and a third link coupling the first optical switch to the second optical switch. During normal operation, the first optical switch connects the first link to the third link and the second optical switch connects the third link to the second link. The communication system comprises a plurality of back-up links coupling the first optical switch to the second optical switch, wherein the back-up links have various costs and latencies. In response to a fault on the third link, the first optical switch and the second optical switch are configured to automatically select an available one of the back-up links having a lowest cost and an acceptable latency, and in response to the selection, to automatically disconnect the first link and the second link from the third link and automatically connect the first link and the second link to the selected back-up link.

In some examples of the invention, the first communication device is configured to provide Open Systems Interconnect (OSI) layer 2/3 protection in response to a carrier delay timer time-out, wherein the carrier delay timer is set based on a time period that allows the first optical switch and the second optical switch to detect the fault and implement the selected back-up link. The time period may comprise a detection time period to detect the fault, a switch time period to select the selected back-up link, and a restoration time period for a signal to propagate over the selected back-up link.

In some examples of the invention, the links comprise optical wavelengths.

In some examples of the invention, the first communication device and the second communication device comprise Internet routers.

In some examples of the invention, the first communication device and the second communication device comprise tier one Internet routers.

In some examples of the invention, the first communication device comprises a first Internet router and the second communication device comprises a second Internet router. The communication system further comprises a third Internet router that forms a first mated pair with the first Internet router and a fourth Internet router that forms a second mated pair with the second Internet router.

In some examples of the invention, the first communication device and the second communication device comprise asynchronous transfer mode systems.

In some examples of the invention, the first communication device and the second communication device comprise multi-protocol label switching systems.

In some examples of the invention, the third link and the fourth link follow a first path and the fifth link follows a second path, and wherein the first path is geographically shorter than the second path.

In some examples of the invention, the acceptable latency in specified by a service level agreement.

BRIEF DESCRIPTION OF THE DRAWINGS

The same reference number represents the same element on all drawings.

DETAILED DESCRIPTION OF THE PREFERRED EMBODIMENT

Figure 1:
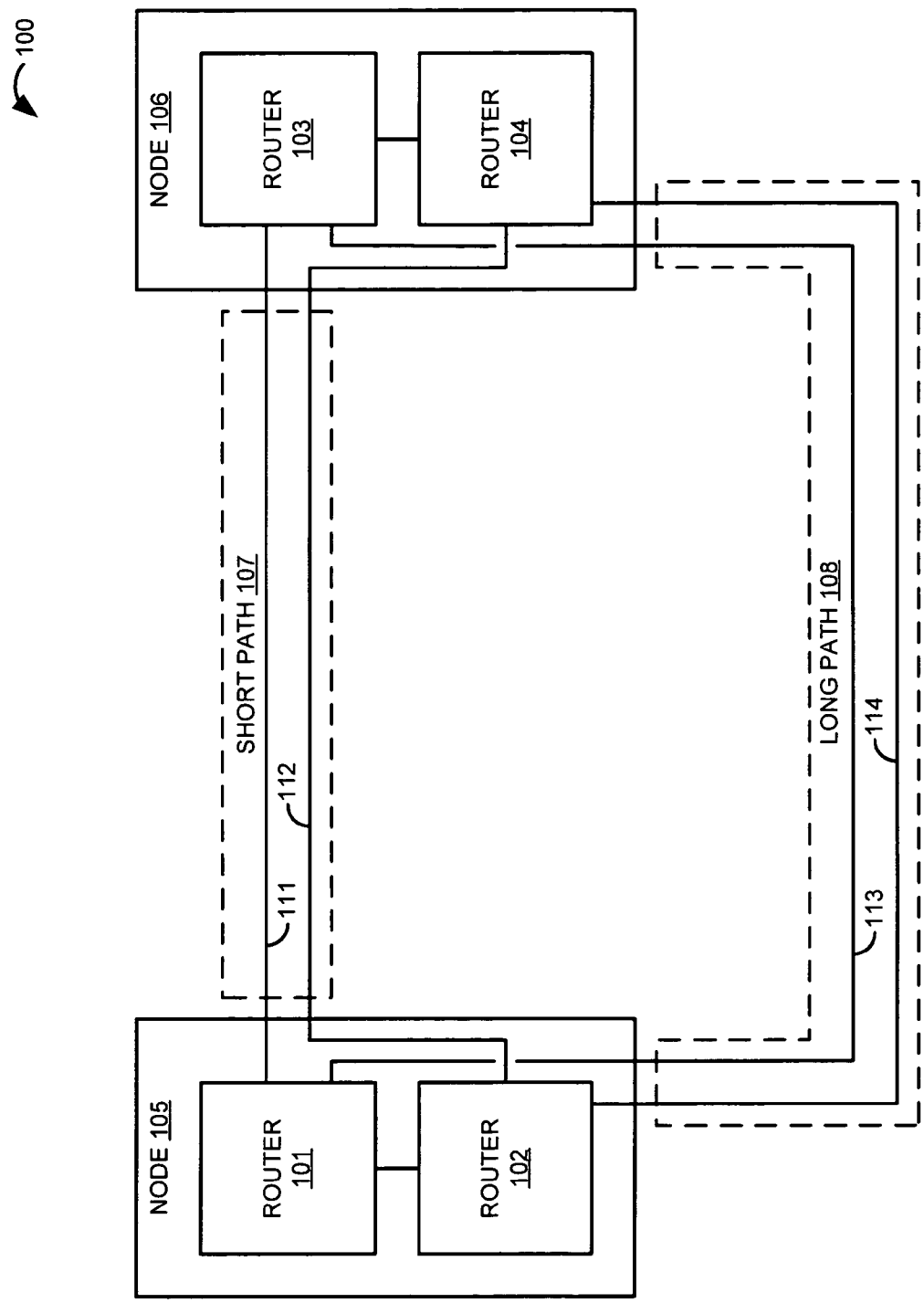
FIG. 1 illustrates a communication system in an example of the prior art.
Figure 2:
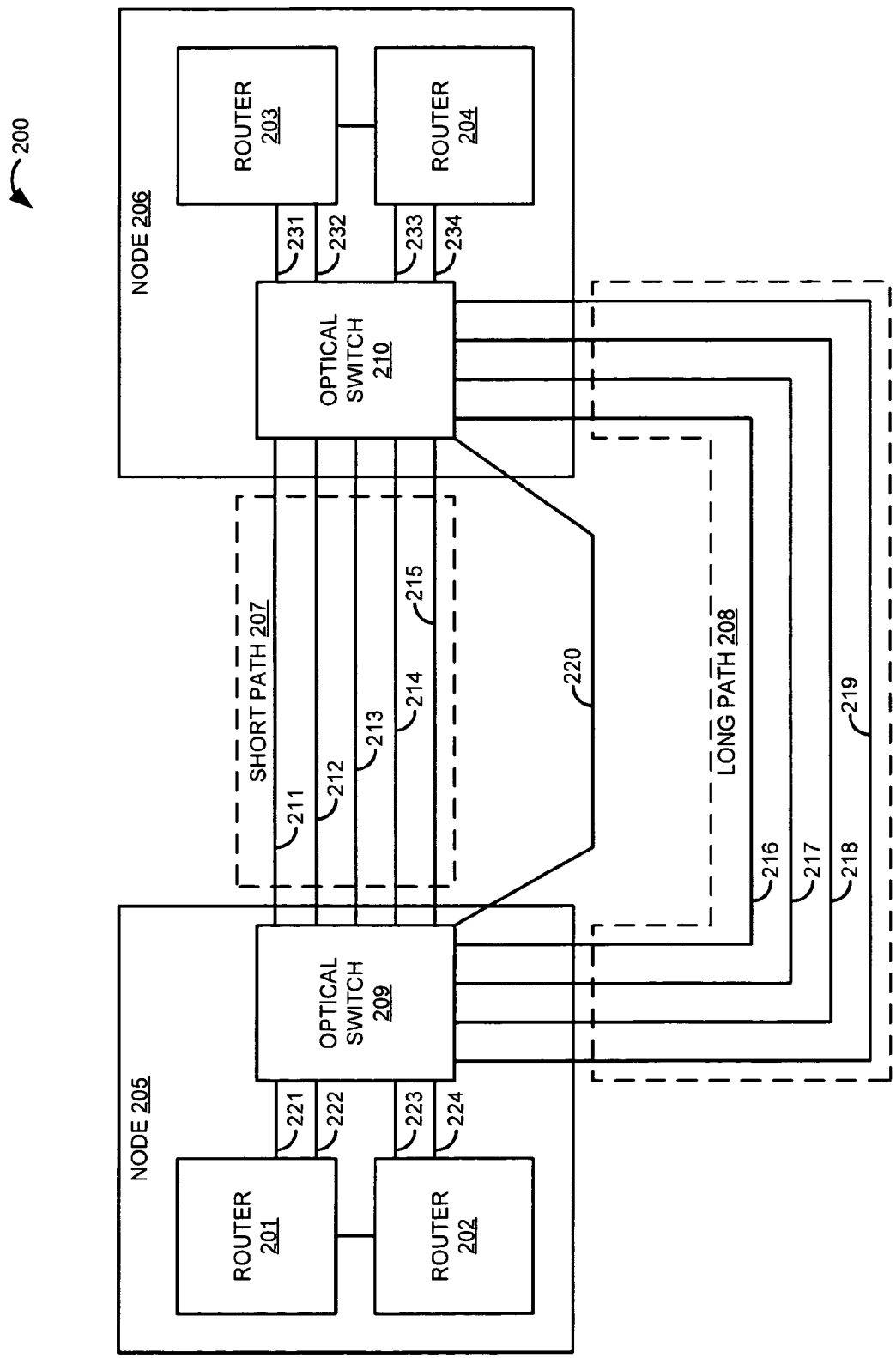
FIG. 2 illustrates a communication system in an example of the invention.

FIG. 2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below for the various examples can be combined in various ways to form multiple variations of the invention. As a result, the invention is not limited to the specific examples described below, but only by the claims and their equivalents.

FIG. 2 illustrates communication system 200 in an example of the invention. Communication system 200 includes nodes 205-206 and paths 207-208. Node 205 includes routers 201-202 that form a first mated pair. Node 205 also includes optical switch 209. Optical switch 209 is coupled to router 201 by links 221-222. Optical switch 209 is coupled to router 202 by links 223-224. Node 206 includes routers 203-204 that form a second mated pair. Node 206 also includes optical switch 210. Optical switch 210 is coupled to router 203 by links 231-232. Optical switch 210 is coupled to router 204 by links 233-234.

Optical switches 209-210 could be optical switching systems, such as the SN 16000 supplied by Sycamore, the Core Director supplied by Ciena, the HDX supplied by Nortel, or another suitable optical switch. Optical switches 209-210 could be all-optical or could have intermediate electrical stages. Optical switches 209-210 could include external control systems that are not shown for clarity.

Path 207 includes links 211-215. Path 108 includes links 216-219. Links 211-219 couple optical switch 209 to optical switch 210. Paths 207-208 are geographically diverse to provide path diversity if path 207 fails. In this example, path 207 is geographically shorter than path 208—possibly by thousands of miles. In some cases, nodes 205 and 206 are on a communication ring where short path 207 represents a short segment of the ring between nodes 205-206, and long path 208 represents the longer segment around the other side of the ring.

Optical switch 209 is also coupled to optical switch 210 by link 220, which is at least partially external to paths 207-208. Link 220 could be a part of a mesh network, ring network, hybrid ring/mesh network, or some other network.

Links 211-224 and 231-234 could be bi-directional. Links 211-215 could represent different optical fibers, different wavelengths on one or more fibers, or different signals (such as STS-1 signals) on one or more fibers. Links 216-219 could represent different optical fibers, different wavelengths on one or more fibers, or different signals on one or more fibers. Links 221-222 could represent different optical fibers, different wavelengths on one or more fibers, or different signals on one or more fibers. Links 223-224 could represent different optical fibers, different wavelengths on one or more fibers, or different signals on one or more fibers. Links 231-232 could represent different optical fibers, different wavelengths on one or more fibers, or different signals on one or more fibers. Links 233-234 could represent different optical fibers, different wavelengths on one or more fibers, or different signals on one or more fibers.

In a normal operating mode, optical switch 209 connects link 221 to link 211, and connects link 222 to link 212. Optical switch 210 connects link 211 to link 231, and connects link 212 to link 232, so traffic between router 201 and router 203 traverses links 221-211-231 and links 222-212-232. In a normal operating mode, optical switch 209 connects link 223 to link 213, and connects link 224 to link 214. Optical switch 210 connects link 213 to link 233, and connects link 214 to link 234, so traffic between router 202 and router 204 traverses links 223-213-233 and links 224-214-234.

In a normal operating mode, links 211-214 are each loaded to 40% of capacity. Note that all links that carry traffic between nodes 205-206 in a normal operating mode now follow short path 207, instead of using longer links 216-219 in a normal operating mode.

In the prior art communication system, all restoration upon either router or link failure is handled by the routers, and thus, is handled at layer 2/3 of the OSI stack. In communication system 200, optical switches 209-210 handle restoration upon link failure, and routers 201-204 handle restoration upon router failure. Thus, link failure is handled at layer 1 of the OSI stack, and router failure is handled at layer 2/3 of the OSI stack.

If router 201 fails, then mated router 202 takes over for router 201, so that router failure is handled at layer 2/3 of the OSI stack. In this failure mode, the load of links 211-212 drops to zero since these links are coupled to failed router 201, and correspondingly, the load of links 213-214 rises from 40% to 80%, because these links now carry the added load from unused links 211 and 213. Optical switches 209-210 retain their current link connections.

If link 211 fails, then optical switch 209 disconnects link 221 from failed link 211 and connects link 221 to the available link having the lowest cost with acceptable latency between nodes 205 and 206. In this example, the available link with the lowest cost and acceptable latency is link 215 within short path 207, so optical switch 209 connects link 221 to link 215. Likewise, optical switch 210 disconnects failed link 211 from link 231 and connects link 215 to link 231. Traffic between router 201 and router 203 that would have been transferred over failed link 211 now traverses links 221-215-231.

If link 212 fails while link 211 is still in failure mode, then optical switch 209 disconnects link 222 from failed link 212 and connects link 222 to the available link with the lowest cost and acceptable latency between nodes 205 and 206. In this example, link 215 is not available because it has taken over for link 211, so the available link with the lowest cost and acceptable latency is link 220. Optical switch 209 disconnects failed link 212 from link 222 and connects link 222 to link 220. Likewise, optical switch 210 disconnects failed link 212 from link 232 and connects link 220 to link 232, so traffic between router 202 and router 203 that would have been transferred over failed link 212 now traverses links 222-220-232. Other link failures could be treated in a similar fashion, so links 211-214 share back-up link 220.

If links 211-215 all fail (possibly due to a fiber cut on path 207), and if link 220 is unavailable, then optical switch 209 disconnects links 221-224 from respective failed links 211-214, and optical switch 210 disconnects links 231-234 from respective failed links 211-214. Optical switch 209 connects links 221-224 to the available links with the lowest cost and acceptable latency—respective links 216-219 in this case. Likewise, optical switch 209 connects links 231-234 to respective links 216-219. Thus, traffic from router 201 to router 203 traverses links 221-216-231 and links 222-217-232. Traffic from router 202 to router 204 traverses links 223-218-233 and links 224-219-234. Like links 215 and 220, links 216-219 could also be shared with other links (not shown).

Optical switches 209-210 perform a series of steps to perform restoration at layer 1. First, optical switches 209-210 detect a loss of signal during a detection time period. The detection time period could be less than 10 milliseconds, and may be set by a standard. Second, optical switches 209-210 determine a new route and perform the corresponding switching to the new route during a switch time period. This entails selecting an available lowest cost link with acceptable latency. The switch time period could be between 20-500 milliseconds with a typical value of 200 milliseconds. Third, optical switches 209-210 transfer the signal over the new route, and the signal must propagate to the receiving end during a restoration time period. The restoration time period is based on the speed of light in the fiber, the length of the fiber, and processing delays at intermediate nodes. A factor may be used to calculate the restoration time period, such as 8 milliseconds for each 1000 miles of the restoration path.

Routers 201-204 have a carrier delay timer that times out after a loss of signal before layer 2/3 restoration is implemented. The timer prevents layer 2/3 restoration from occurring in response to a mere signal glitch where a quality signal quickly returns. In prior systems, the timer is set relatively low, such as 10 milliseconds.

For the restoration described above, the carrier delay timer should be set to allow completion of layer 1 restoration, before layer 2/3 restoration is initiated. Thus, if the detection time period is 5 milliseconds, the switch time period is 200 milliseconds, and the restoration time period 15 milliseconds, then the timer could be set to at least 220 milliseconds to allow layer 1 restoration to complete before layer 2/3 restoration is attempted. Thus, the carrier delay timer is set to allow layer 1 restoration to fix the problem and avoid layer 2/3 restoration. The setting of the carrier delay timer in prior systems would cause the timer to time out well before layer 1 restoration had completed, and thus, would cause unnecessary and conflicting layer 2/3 restoration to occur in parallel with layer 1 restoration.

Optical switches 209-210 select back-up links having the lowest cost with acceptable latency. The actual latency of a link could be set by testing or calculation. The acceptable latency could be set by industry standard or practice, or could be specified by the customer, such as in their Service Level Agreement (SLA).

The cost determination could be made based on several factors. One factor is the cost per mile for the link times the length of the link. Another factor is the lease price for links that are leased from other carriers. Another factor are SLAs that may specify costs for various service levels, time or rebates for poor quality, so that the cost of using a link would include the service level cost or rebate. Costs, including those specified in leases or SLAs, may vary based on time of day, day of week, and date of year.

The various costs and latencies could be determined prior to any failures, and the restoration logic for optical switches 209-210 could be programmed, in the event of a link failure, to select the available link having the lowest cost and acceptable latency based on the pre-determined costs and latencies. This pre-determined information would need to be updated to reflect any changes in costs or latencies. For example, the lease cost for a link could go up, or additional components on a link could add latency. The availability of the links would also need to be continually updated. In the above example where link 215 was used to restore failed link 211, the status of link 215 would be changed to unavailable.

Thus for a specific link, there would be an acceptable latency and a list of possible back-up links with indications of the availability, cost, and latency for each back-up link. From this list, the available link with the lowest cost and the acceptable latency could be selected when the specific link fails. Alternatively, costs and/or latencies could be calculated dynamically in response to link failure.

Routers 201-204 could be Tier 1 Internet routers that are connected to the Internet backbone. Alternatively, nodes 205 and 206 could include Asynchronous Transfer Mode (ATM) or Multi-Protocol Label Switching (MPLS) devices instead of, or in addition to, routers 201-204. In addition, the routers and devices within nodes 205-206 may not be configured as mated pairs.

ADVANTAGES

Communication system 200 can be implemented to provide the following advantages, although some implementations of communication system 200 may not provide these advantages. Communication system 200 transfers traffic on shorter links during normal operating conditions. This improves latency for the traffic that was transferred over the longer links in prior systems. If a fault does occur, communication system 200 uses back-up links having the lowest cost and acceptable latency.

The invention claimed is:

1. A communication system comprising:
   a first communication device and a second communication device;
   a first optical switch and a second optical switch;
   a first link coupling the first communication device to the first optical switch, and a second link coupling the second communication device to the second optical switch;
   a third link coupling the first optical switch to the second optical switch, wherein during normal operation, the first optical switch connects the first link to the third link and the second optical switch connects the third link to the second link;
   a plurality of back-up links coupling the first optical switch to the second optical switch, wherein the back-up links have various monetary costs and latencies; and in response to a fault on the third link, the first optical switch and the second optical switch are configured to automatically select an available one of the back-up links having a lowest monetary operating cost and an acceptable latency, and in response to the selection, to automatically disconnect the first link and the second link from the third link and automatically connect the first link and the second link to the selected back-up link;

wherein the first communication device is configured to provide Open Systems Interconnect (OSI) layer 2/3 protection in response to a carrier delay timer time-out, wherein the carrier delay timer is set based on a time period that allows the first optical switch and the second optical switch to detect the fault and implement the selected back-up link; and wherein the time period comprises a detection time period to detect the fault, a switch time period to select the selected back-up link, and a restoration time period for a signal to propagate over the selected back-up link.

2. The communication system of claim 1 wherein the links comprise optical wavelengths.

3. The communication system of claim 1 wherein the first communication device and the second communication device comprise Internet routers.

4. The communication system of claim 1 wherein the first communication device and the second communication device comprise tier one Internet routers.

5. The communication system of claim 1 wherein the first communication device comprises a first Internet router and the second communication device comprises a second Internet router, and further comprising a third Internet router that forms a first mated pair with the first Internet router and a fourth Internet router that forms a second mated pair with the second Internet router.

6. The communication system of claim 1 wherein the first communication device and the second communication device comprise asynchronous transfer mode systems.

7. The communication system of claim 1 wherein the first communication device and the second communication device comprise multi-protocol label switching systems.

8. The communication system of claim 1 wherein the acceptable latency is specified by a service level agreement.

9. A method of operating a communication system, the method comprising:

providing a first communication device and a first optical switch with a first link coupling the first communication device to the first optical switch;

providing a second communication device and a second optical switch with a second link coupling the second communication device to the second optical switch;

providing a third link coupling the first optical switch to the second optical switch, wherein during normal operation, the first optical switch connects the first link to the third link and the second optical switch connects the third link to the second link;

providing a plurality of back-up links coupling the first optical switch to the second optical switch, wherein the back-up links have various monetary costs and latencies; and in response to a fault on the third link, automatically selecting an available one of the back-up links having a lowest monetary operating cost and an acceptable latency; and in the first optical switch and the second optical switch, automatically disconnecting the first link and the second link from the third link and automatically connecting the first link and the second link to the selected back-up link;

wherein the first optical switch is configured to provide Open Systems Interconnect (OSI) Layer 1 protection in response to a loss of signal, the first communication device is configured to provide OSI layer 2/3 protection in response to a carrier delay timer time-out, and further comprising setting the carrier delay timer based on a time period that allows the OSI layer 1 protection to complete; and wherein the time period comprises a detection time period to detect the fault, a switch time period to select the selected back-up link, and a restoration time period for a signal to propagate over the selected back-up link.

10. The method of claim 9 wherein the links comprise optical wavelengths.

11. The method of claim 9 wherein the first communication device and the second communication device comprise Internet routers.

12. The method of claim 9 wherein the first communication device and the second communication device comprise tier one Internet routers.

13. The method of claim 9 wherein the first communication device comprises a first Internet router and the second communication device comprises a second Internet router, and wherein the communication system comprises a third Internet router that forms a first mated pair with the first Internet router and a fourth Internet router that forms a second mated pair with the second Internet router.

14. The method of claim 9 wherein the first communication device and the second communication device comprise asynchronous transfer mode systems.

15. The method of claim 9 wherein the first communication device and the second communication device comprise multi-protocol label switching systems.

16. The method of claim 9 wherein the acceptable latency is specified by a service level agreement.

* * * * *